W. A. LORENZ.
EJECTING MECHANISM FOR VENDING MACHINES.
APPLICATION FILED DEC. 5, 1916.
1,292,619.
Patented Jan. 28, 1919.
5 SHEETS—SHEET 3.
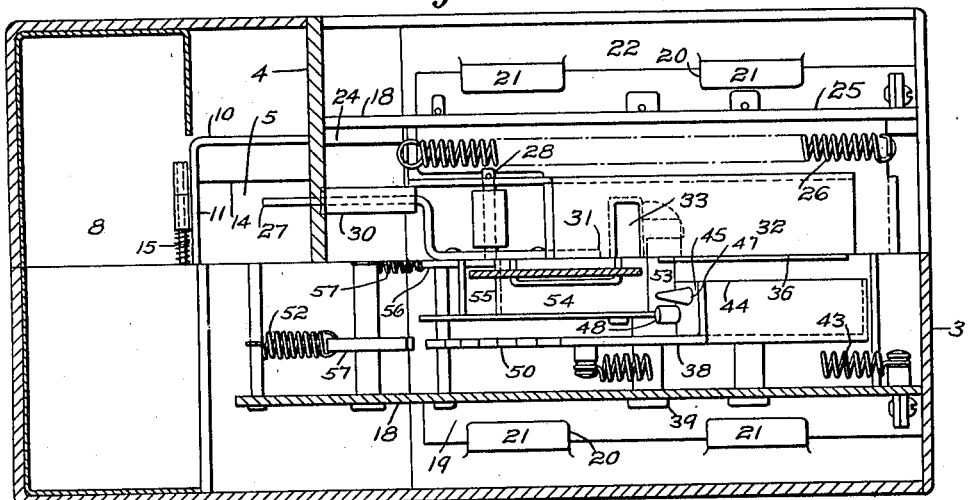
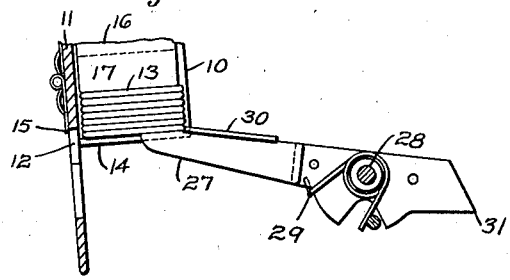
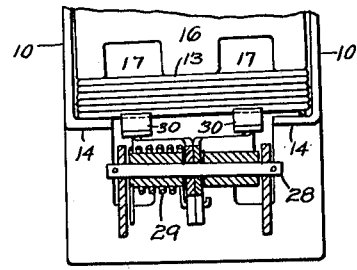
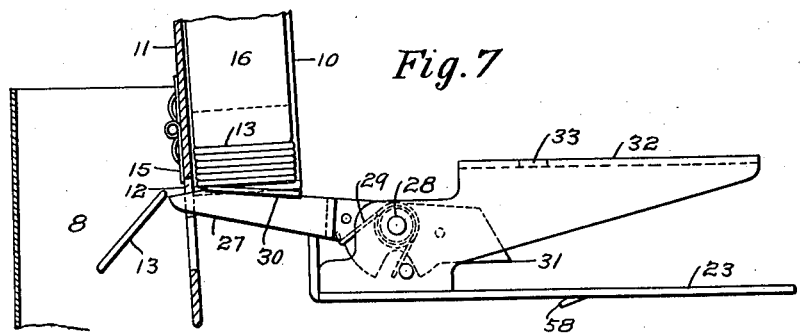
Witness
E. L. Jarvis
M. E. Fallow
Inventor
William A. Lorenz
by Harry R. Williams
Atty

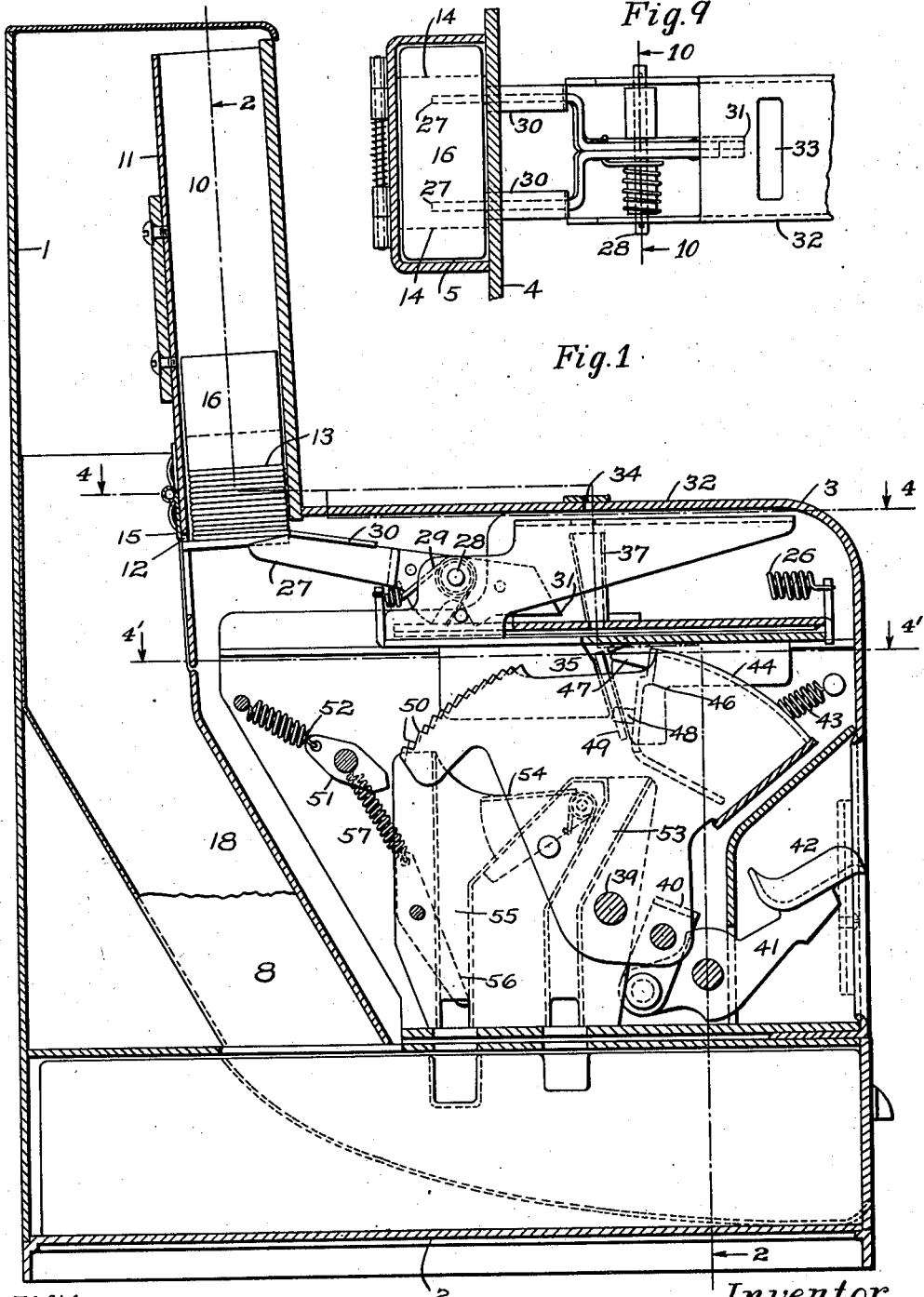

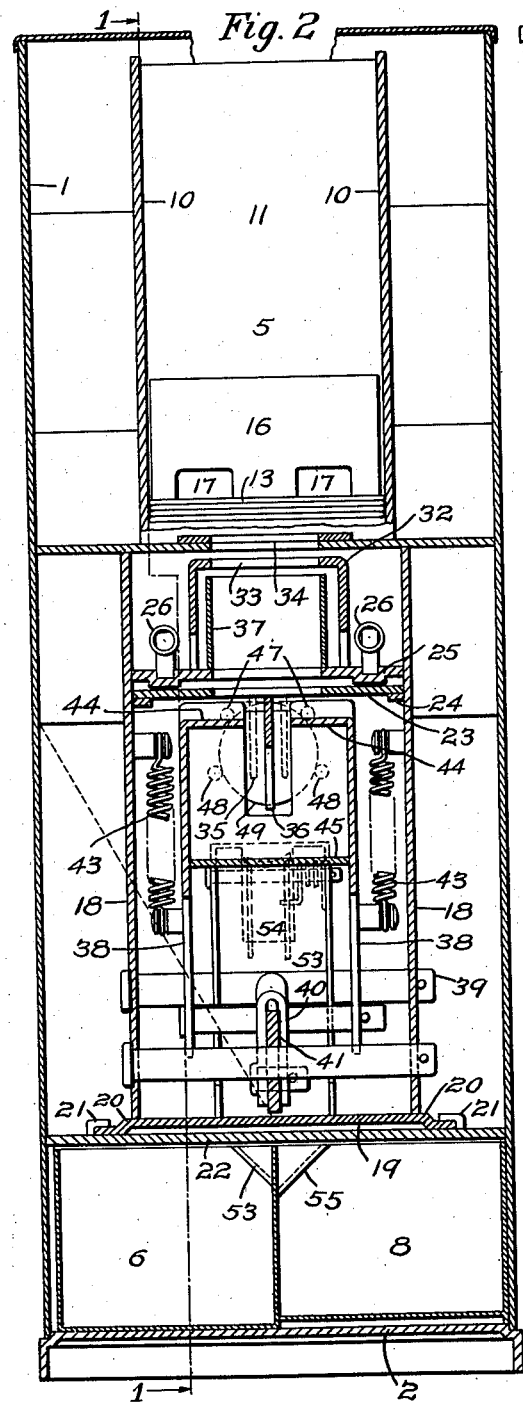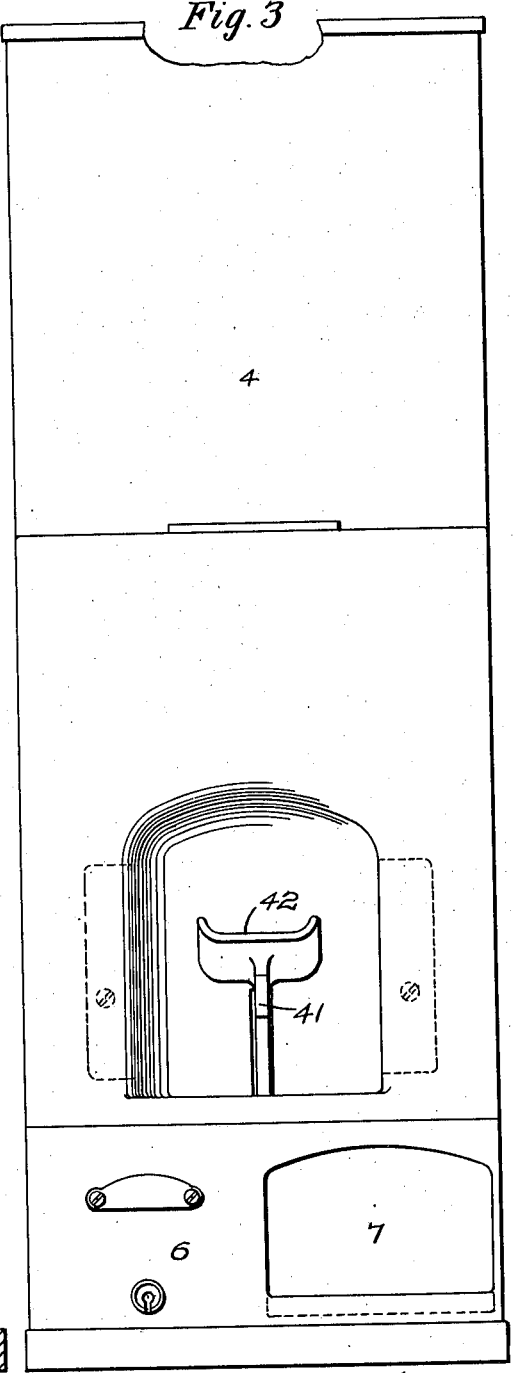

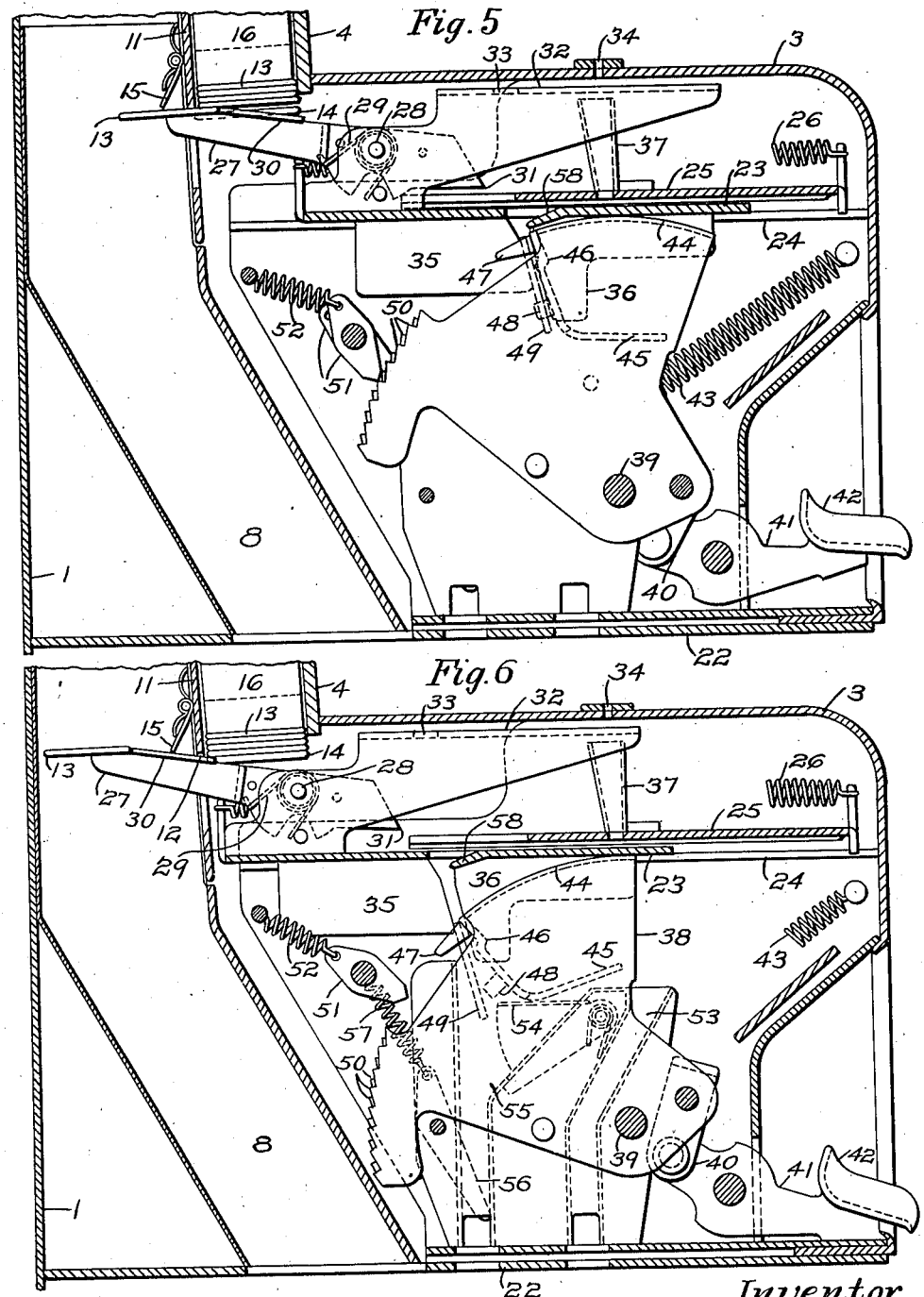

W. A. LORENZ.
EJECTING MECHANISM FOR VENDING MACHINES.
APPLICATION FILED DEC. 5, 1916.

1,292,619.

Patented Jan. 28, 1919.
5 SHEETS—SHEET 5.

Witness
E. L. Jarvis
M. E. Fallon

Inventor
Wm. A. Lorenz
by Harry R. Williams
Atty

UNITED STATES PATENT OFFICE.

WILLIAM A. LORENZ, OF HARTFORD, CONNECTICUT.

EJECTING MECHANISM FOR VENDING-MACHINES.

1,292,619. Specification of Letters Patent. Patented Jan. 28, 1919.

Application filed December 5, 1916. Serial No. 135,139.

*To all whom it may concern:*

Be it known that I, WILLIAM A. LORENZ, a citizen of the United States, residing at Hartford, in the county of Hartford and State of Connecticut, have invented a new and useful Improvement in Ejecting Mechanism for Vending-Machines, of which the following is a specification.

This invention relates to the class of machines which are designed to hold a stock of articles or packages of merchandise, or other commodities, and eject the goods a unit at a time when the handle is manipulated if a coin of the proper denomination has been inserted.

The object of the invention is to provide a simple mechanism for a machine of this nature, which will surely eject the goods if a coin of the proper denomination is inserted but will become locked and prevent the insertion of a coin when the supply of goods is exhausted.

Figure 11:
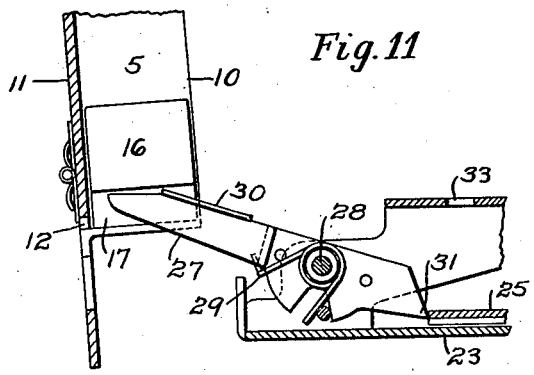
Figures 12, 13:
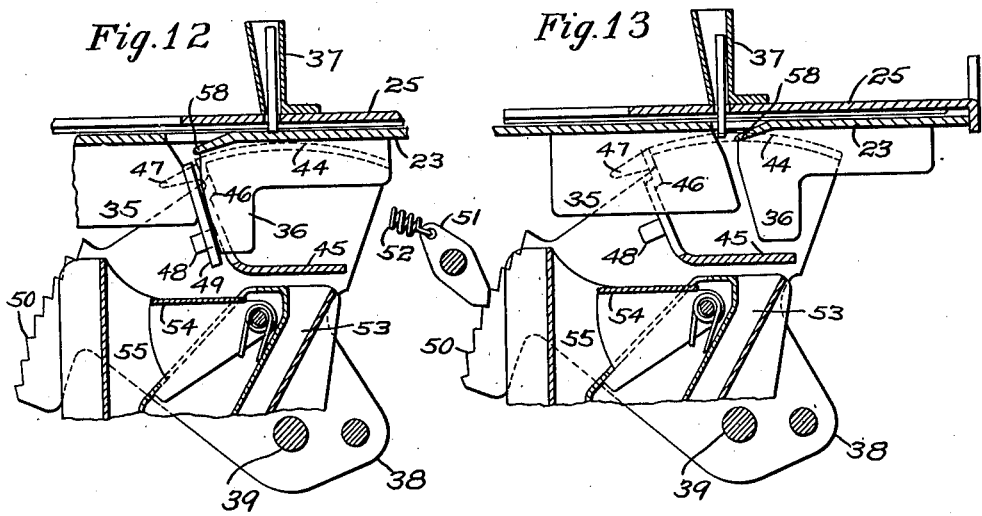
Figure 14:
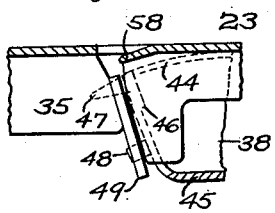
Figure 15:
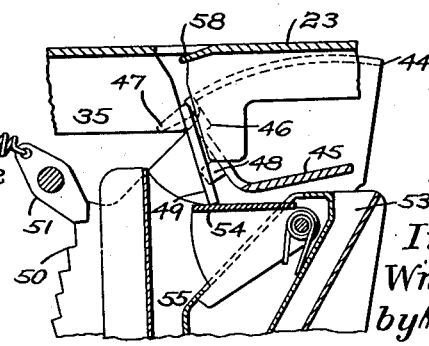

The invention is illustrated as embodied in a machine adapted for vending thin commodities, such as tickets, although, of course, it may be used for vending other goods. Figure 1 shows a vertical section of such a machine looking toward one side on the plane indicated by the dotted line 1—1 on Fig. 2, with the operating mechanisms in normal position. Fig. 2 shows a vertical section looking toward the rear on the dotted line 2—2 on Fig. 1. Fig. 3 shows a front elevation of the machine. Fig. 4 shows a horizontal section, the upper half of the view being on the dotted line 4—4 on Fig. 1, and the lower half of the view being on the dotted line 4'—4' on Fig. 1. Fig. 5 shows a side elevation of the operating mechanisms in the positions occupied when the ejector is pushing back the lowest ticket of a pile in the holder. Fig. 6 is a similar view with the ejector in its rear position and the ticket completely pushed out and ready to drop into the discharge chute. Fig. 7 shows a side view of the ejector on its return stroke and the ticket dropping into the discharge chute. Fig. 8 shows a side view of the ejector in a position to push a ticket out of the stack. Fig. 9 shows a horizontal section of the stack and a plan of the ejector. Fig. 10 shows a vertical section through the ejector taken on the plane indicated by the dotted line 10—10 on Fig. 9 and showing the relative positions of the parts when the ejector is pushing out a ticket which lies out of level in the stack. Fig. 11 shows the position assumed by the ejector when the stack is empty, illustrating how it is impossible for it to return under these conditions. Fig. 12 shows a portion of the mechanisms moved from their normal position of rest with a second coin held from entering by the ejector slide. Fig. 13 shows a portion of the mechanisms illustrating how a coin cannot be inserted into the machine during the movement of the coin pusher. Fig. 14 illustrates the coöperation of the ejector slide and coin pusher on a coin at one position during rearward movement. Fig. 15 shows some of the parts with the coin pushed backward by the coin pusher and also held upwardly by means of a latch which prevents the coin from falling down into the coin chute until the movement of the coin pusher has been completed and the goods entirely ejected.

The machine illustrated has a casing 1 mounted on a base 2. The front 3 of the casing is removable to permit the withdrawal of the operating mechanisms, and the cover 4 is removable from the front of the stack 5 to permit the introduction of the goods to be vended. In the bottom of the case on one side is a drawer 6 for holding the coin received for goods delivered, and on the other side is the opening 7 at the end of the discharge chute 8 for the delivery of such goods as are ejected or to return the coin of improper denomination. The casing, cover and coin drawer may be fastened by any suitable means to prevent unauthorized access to money, goods or mechanisms.

The stack shown has two sides 10 and a back 11 that is longer than the sides and that near the bottom has an opening 12 of a size which permits the passage of the ejector fingers and the goods pushed out from the bottom of the stack into the discharge chute when the ejector is moved rearwardly. The tickets 13 or other goods are piled in the stack which is of the necessary size and shape to receive them and they are supported by the inturned lower edges 14 of the sides of the stack. These supports are below the top of the opening through the back plate a sufficient distance to permit the lowest unit of the pile in the stack to be pushed out, and a rearwardly opening spring trap door 15 is arranged on the back plate to close the upper part of the opening so the goods cannot be shaken out. On the top of the pile of goods in the stack is a weight 16. The lower part of the weight has slots 17 which allow the ends of the ejector fingers to rise when there are no goods in the stack.

The ejector and other operating mechanisms are mounted on a frame consisting of two side plates 18 and a bottom plate 19. The bottom plate has side extensions 20 that slide under lugs 21 on the plate 22 that extends across the case above the coin drawer and discharge opening. When the front of the case is opened all of the operating mechanisms may be removed at once by drawing out the frame (Figs. 2, 4).

The ejector slide 23 is movable back and forth on ways 24 that extend inwardly from the side plates of the frame below a fixed plate 25 (Figs. 1, 2). Springs 26 are arranged to draw the ejector slide toward the front of the machine. The ejector has two rearwardly extending fingers 27 which are fastened together and are pivotally mounted on an arbor 28 carried by the slide. The rear ends of the fingers are normally held raised by a spring 29 and the opening through them is somewhat larger in diameter than the diameter of the arbor 28 upon which they are mounted so that they can tilt. If there are goods in the stack the spring holds the rear ends of the ejector fingers pressed up against the goods. Each ejector finger carries a pushing block 30, the rear edge of which is a little less in height than the thickness of one of the units of the goods to be pushed out of the stack into the discharge chute. When there are goods in the stack the rearward movement of the ejector fingers pushes the lowest unit of the pile out into the discharge chute. As the fingers are hung loosely on the arbor and their rear ends are lifted by the spring, if the goods should be out of level, as shown in Fig. 10, or if the goods should be bent or warped, both fingers will engage with the front edges of the goods so as to surely eject the lowest unit of the pile (Fig. 8). The forward end of the ejector is provided with an extension 31, and after the last piece of goods has been ejected from the stack the spring will throw the rear ends of the fingers up, the weight being slotted, as previously described, to admit of this (Fig. 11), and throw the front end down so that it will, when the ejector attempts to return, engage the rear edge of the fixed plate 25 and thus prevent the further forward movement of the ejector.

Attached to the ejector slide is a guard plate 32. This guard plate has a slot 33 that, when the ejector is in its normal position of rest, registers with a slot 34 in the casing through which the coin is inserted when it is desired to operate the machine. As the slot in this guard plate only registers with the slot in the case when the ejector is fully forward, a coin cannot be inserted unless the stack contains goods and the mechanisms are in their normal position of rest.

Attached to and extending downwardly from the underside of the ejector slide are two nose plates 35 and one nose plate 36, the former being parallel and the latter being in front of the space between the former and projecting lower down. These plates are arranged so there will be a space a little wider than the thickness of a coin between the front edges of the two rear plates and the rear edge of the single front plate. There is an opening through the ejector slide at the upper end of the space between these nose plates, and when the ejector slide is forward in its normal position of rest this opening registers with a passage through a chute 37 that is supported by the fixed plate 25 and that is in line with the coin slot 34 in the casing.

The coin pusher consists of two plates 38 which are pivotally mounted on an arbor 39 that is held by the side plates of the supporting frame. A link 40 connects the coin pusher with the inner end of the operating lever 41 which on its outer end in a recessed portion of the front casing has a finger piece 42. When the finger piece is pressed down the coin pusher swings rearwardly, a pair of springs 43 draw the coin pusher forwardly. The upper edges 44 of the side plates of the coin pusher extend inwardly toward each other and are curved on an arc, the center of which is the axis of the pusher. Extending between the pusher plates is a plate 45. This plate near the top of the pusher is slotted and on each side is bent forward as at 46. Projecting rearwardly from these pushing faces are two pins 47 and two studs 48, the studs being located sufficiently near together to support a coin 49 of the desired size and sufficiently far apart to let drop between them any smaller coin which may be put into the machine. The upper edges of the side plates of the coin pusher near the rear are provided with ratchet teeth 50. These ratchet teeth are cut so that they are not exactly opposite—the teeth of one being intermediate the teeth of the other—and thereby with coarse teeth effecting the result of a fine tooth ratchet. Pawls 51 are arranged to engage the ratchet teeth and prevent the coin pusher from returning until after it has made a complete rearward movement. Springs 52 hold the pawls with their engaging ends pointing substantially toward the axis of the pusher.

When the parts are at rest and a coin is inserted through the slot in the case and there are goods in the stack, the coin passes through the coin guard and drops through the chute and opening in the bottom of the ejector slide into the space between the edges of the downwardly projecting nose plates carried by the ejector slide. The coin, if it is of the proper denomination to operate the mechanism, is supported in this position by the studs on the coin pusher. If the coin is too small to be supported by the studs it passes between them and drops into the chute 53 that passes down and opens into the discharge chute so that the coin may be regained by the depositor. If the coin is of correct size to operate the machine and it lodges on the studs, when the operating finger piece is depressed and the coin pusher swings rearwardly the pusher acting through the coin and ejector nose pieces moves the ejector rearwardly and causes it to push a unit of the goods from the stack into the discharge chute. As the coin pusher swings rearwardly the top of the coin is engaged by the fingers and held on the studs until the pusher reaches the end of its movement, at which time as the ejector slide moves in a straight line and the pusher swings on the arc of a circle, the pushing faces of the pusher crowd the coin off from the studs and out from under the fingers and beyond the edge of the latch 54 so that it will drop down into the chute 55 and pass into the coin drawer. The pawls prevent the coin pusher from returning until after it has made its full backward stroke and the coin has been cammed off from the studs and latch and from between the nose pieces of the ejector so that it can drop into the coin chute (Fig. 15). At the end of the pusher stroke the latch 54 springs up in front of the coin and prevents it from being carried forward by the return movement of the pusher.

As the coin passes down through the coin chute to the drawer it swings back a latch 56 which is so pivoted and held by a spring 57 that its lower end projects into the chute. The tension of the spring and the arrangement of the latch is such that the coin in dropping down will readily swing back the lower end of the latch and pass it. The latch prevents the return of any coin from the coin drawer and the consequent clogging of the mechanism even should the machine be turned upside down.

A coin cannot be inserted in the machine when the ejector is in any position except normal. If two coins should be inserted before the machine is operated one will pass down into the space between the nose plates below the ejector and will be supported by studs on the pusher, while the other will be lifted back into the chute above the ejector slide by the turned down lip 58 on the slide as the ejector slide moves rearwardly and be held there until after goods have been ejected and the ejector has again returned to normal position, then the second coin will drop down into position to operate the machine (Figs. 12, 13). If a coin is inserted when the ejector is in normal position, but the coin pusher has been swung rearwardly to any extent by means of the handle, the coin will pass down and rest upon the curved upper inturned edges of the pusher plates and remain there as the pusher moves until it has been returned to normal position (Fig. 13).

The invention claimed is:

1. In a vending machine the combination of a frame, a goods stack mounted on the frame, a slide movable on the frame, means for reciprocating the slide, ejector fingers pivotally mounted upon the slide and extending beneath the stack, a spring for lifting the ejecting ends of said fingers into the lower end of the stack, and stationary means fixed to the machine frame engaged by the fingers and preventing the forward movement of the slide when the ejecting ends of the fingers are lifted above ejecting level in the stack.

2. In a vending machine the combination of a goods stack, a weight with a slotted under face movable up and down in the stack, a slide, means for reciprocating the slide, ejector fingers pivotally mounted upon the slide and extending beneath the stack, a spring for lifting the ejecting ends of said fingers into the lower end of the stack and into the slots in the weight when there are no goods in the stack, and fixed means independent of the weight engaged by the front ends of the fingers and preventing the forward movement of the slide when the ejecting ends of the fingers extend into the slots in the weight.

3. In a vending machine the combination of a frame, a goods stack mounted on the frame, a slide movable on the frame, means for reciprocating the slide, a slotted plate carried by the slide, ejector fingers pivotally mounted on the slide and extending beneath the stack, means for lifting the ejecting ends of the fingers into the lower end of the stack, and stationary means fixed to the frame for engaging the forward ends of the fingers preventing the forward movement of the slide and slotted plate when the ejecting ends of the fingers are lifted above ejecting level in the stack.

4. In a vending machine the combination of a goods stack, a weight with slots in its under face movable up and down the stack, a slide, means for reciprocating the slide, a slotted plate carried by the slide, ejector fingers pivotally mounted on the slide and extending beneath the stack, means for lifting the ejecting ends of the fingers into the lower end of the stack and slots in the weight, and fixed means independent of the weight for engaging the front ends of the fingers and preventing the forward movement of the slide and slotted plate when the ejecting ends of the fingers extend into the slots in the weight.

5. In a vending machine the combination of a goods stack, a slide, means for reciprocating the slide, ejector fingers pivotally mounted on the slide and extending beneath the lower end of the stack, means for swinging the rear ends of the fingers up into the bottom of the stack, and a fixed plate engaging the front ends of said fingers and preventing the return of the slide when the rear ends of the fingers are swung up into the stack.

6. In a vending machine the combination of a frame, a goods stack mounted on the frame, a slide movable on the frame, means for reciprocating the slide, ejector fingers pivoted on the slide, push plates mounted on the ejector fingers, means for turning the rear ends of the ejector fingers upwardly and the front ends of the ejector fingers downwardly, and stationary means fixed to the frame for engaging the front ends of the ejector fingers when the rear ends of the fingers are turned up above normal ejecting position.

7. In a vending machine the combination of a goods stack, a slide, means for reciprocating the slide, ejector fingers mounted so as to have independent oscillatory movements, on the slide, means for swinging the rear ends of the fingers up into the bottom of the stack, and means engaged by either finger and preventing the forward movement of the slide when the ejecting end of either finger is lifted above normal ejecting level in the stack.

WILLIAM A. LORENZ.